United States Patent [19]
West et al.

[11] 3,878,617
[45] Apr. 22, 1975

[54] LINE LEVEL
[75] Inventors: Robert Ferguson West, West Simsbury; Maarten Cornelis De Jong, Canton, both of Conn.
[73] Assignee: The Stanley Works, New Britain, Conn.
[22] Filed: Nov. 24, 1972
[21] Appl. No.: 309,097

[52] U.S. Cl. .................................................. 33/369
[51] Int. Cl. ............................................. G01c 9/28
[58] Field of Search....................... 33/369, 379, 381

[56] References Cited
UNITED STATES PATENTS
3,383,772 5/1968 Gardner et al..................... 33/379 X
FOREIGN PATENTS OR APPLICATIONS
344,001 2/1960 Switzerland........................... 33/369

674,839  4/1939  Germany ............................. 33/369
1,520,134  2/1968  France.................................. 33/379

*Primary Examiner*—Harry N. Haroian
*Assistant Examiner*—Charles E. Phillips
*Attorney, Agent, or Firm*—Prutzman, Hayes, Kalb & Chilton

[57] ABSTRACT

A new and improved one piece molded line level of transparent plastic material is formed using a mold wherein only a single die member controls the formation of all working surfaces of the level as well as the radius of curvature of the bubble-following surface of the bubble chamber.

3 Claims, 5 Drawing Figures

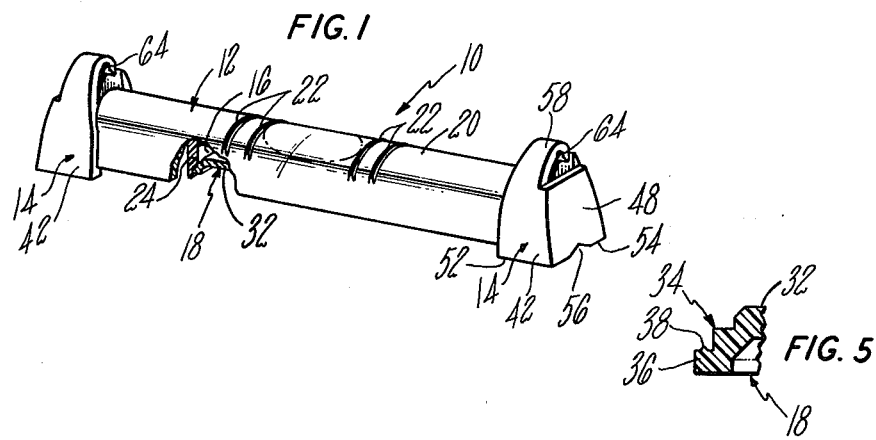
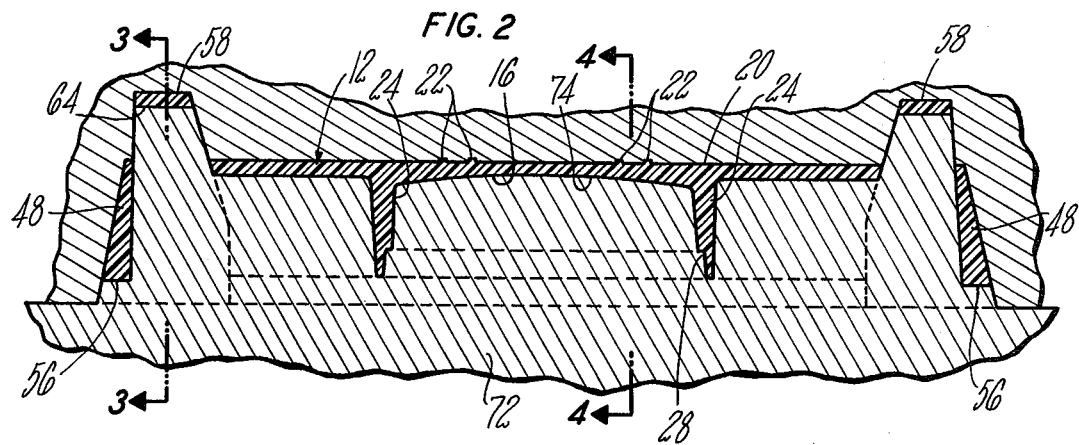
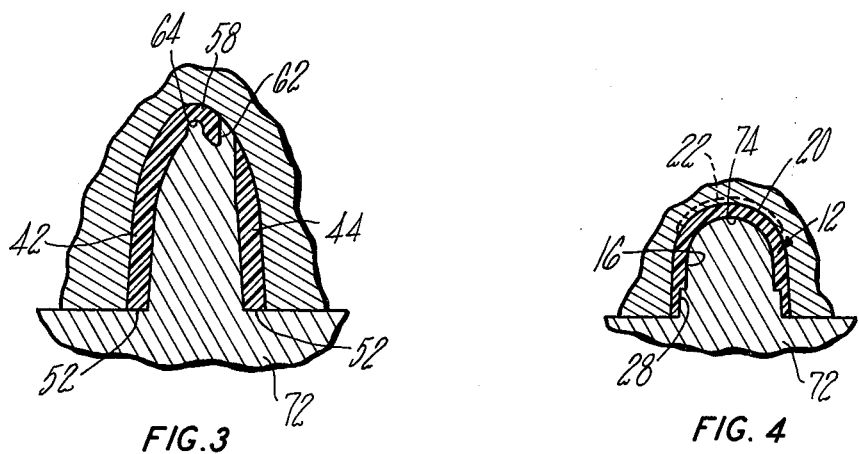

LINE LEVEL

BACKGROUND AND SUMMARY OF THE INVENTION

The present invention relates generally to line levels and the like used by masons or carpenters. More particularly it is concerned with a new and improved one piece molded line level and with its method of manufacture.

In the manufacture of levels of the type described it is essential that the indicating vials or bubble chambers of the levels be precisely aligned with respect to the tool's working surfaces to assure functional and operating accuracy. Heretofore, it has been practice to achieve this accuracy by producing a separate and independent bubble chamber or vial unit and subsequently accurately mount the unit in the level. The unit usually was mounted within a suitable aperture in the level using precision equipment and highly skilled labor to assure precise alignment of the unit with the work surfaces of the level. Numerous techniques of varying complexity and precision have been employed to achieve this desirable and necessary result. Typical of one such technique is the method described in U.S. Pat. No. 3,442,024.

Unfortunately, the use of highly skilled labor and the necessity for precision in the alignment of the bubble chamber add appreciably to the cost of the end product. Accordingly, attempts at cost reduction have received much attention by the industry. One such attempt has involved the utilization of low cost materials such as transparent plastics and the simultaneous molding of both the bubble chamber and the main level body. However, when the chamber was molded as an integral part of the level body, it was necessary either to use a pull core molding operation for forming the bubble chamber or rely on subsequent machining operations to achieve the proper radius of curvature of the chamber.

In accordance with the pull core technique, the level was molded using a curved rod or core having a shape corresponding to the desired inside shape of the bubble chamber. The core was pulled from one end of the newly formed chamber while the plastic material was still warm enough to be flexible. The flexible plastic would distort slightly as the core was removed, but had sufficient memory to cause it to immediately return to its original curved shape before fully solidifying. Unfortunately, this technique is severly limited in the degree of curvature that can be imparted to the bubble chamber since it will not allow an angle of curvature sufficient to permit the level to read pitches of even a few degrees. Such an increase in curvature would cause undue stretch in the material as the core was pulled and the curved portion of the vial would not return to its proper configuration.

Although a slight increase in the radius of curvature of the chamber can be achieved by utilizing a generally rectangular cross-secion configuration, it has been found that visibility is distorted by the square corners of such a vial configuration thereby reducing the desirability of products containing such a chamber.

It is also known that a unitary structure can be provided for both the bubble chamber and level body portions by molding a unitary member and subsequently machining the bubble chamber to obtain a dome shape having the required accuracy and curvature. However, such machining operations not only involve the time and expense of skilled labor, but also are susceptible to machining error, thereby increasing the expense and possible error associated with their manufacture.

Accordingly, a major aim of the present invention is to provide a new and improved unitary line level construction and a new and improved method for its manufacture from low cost materials in such a manner as to substantially reduce the labor requirements associated with its production without sacrificing its accuracy. Included in this object, is the provision for a line level wherein the curvature of the bubble chamber can be accurately and precisely controlled within wide limits and simultaneously accurately positioned relative to all working surfaces of the level. A further object of the present invention is to accomplish the foregoing in a facile and economical manner while obviating the necessity for machining operations that add to the cost and are susceptible of introducing inaccuracies in the resultant product.

Other objects will be in part obvious and in part pointed out in more detail hereinafter.

These and related objects are accomplished in accordance with the present invention by providing a new and improved one piece molded line level in which the curved reading surface of the bubble chamber is accurately formed within a one piece level body during the molding operation. This one piece molded plastic construction includes a plurality of precisely formed utile or work surfaces and is produced by a technique wherein all utile surfaces of the level, as well as the accurately curved reading surface of the bubble chamber are controlled by a single die member of the level producing mold and subsequent machining operations are unnecessary.

A better understanding of the invention will be obtained from the following detailed description and the accompanying drawings of an illustrative application of the invention.

BRIEF DESCRIPTION OF THE DRAWINGS

In the drawings:

FIG. 1 is a perspective view, partially broken away and partially in section, of a line level produced in accordance with the teachings of the present invention, FIG. 2 is a sectional view of a two piece mold utilized in forming the line level of FIG. 1, the view being taken along the length of the level, FIG. 3 is a sectional view taken along the line 3—3 of FIG. 2, FIG. 4 is a sectional view taken along the line 4—4 of FIG. 2; and FIG. 5 is an enlarged sectional view of a portion of the bubble chamber cover plate shown in FIG. 1.

DESCRIPTION OF A PREFERRED EMBODIMENT

Referring now to the drawing in greater detail, wherein like reference numerals indicate like parts throughout the several figures, the present invention is illustrated as embodied within a small, light weight line level, generally designated by the numeral 10. The level 10 in its preferred embodiment, has a length of only about three inches and is molded from transparent plastic material as a one piece or monolithic member having an elongated central body portion 12 suspended between a pair of enlarged terminal mounting legs 14. The elongated bridging portion 12 of the level contains a central bubble chamber 16 suitably enclosed by a cover plate 18 sealably secured thereto. As best seen in FIGS. 1 and 4, the central body portion 12 is a straight, substantially hollow shell member exhibiting an inverted U-shaped cross-sectional configuration. The smoothly rounded top or exposed surface 20 of portion 12 is provided with two sets of transversely extending ridges 22 equally spaced on opposite sides of the level's center line or longitudinal midpoint. These ridges 22 can advantageously serve as bubble limit lines or as pitch reading lines of the light weight level. The single bubble chamber 16 in this small, light weight level is illustrated in FIG. 2 as occupying approximately one third of the level's total length, being bounded on opposite ends by a pair of depending wall members 24 extending fully across the interior of the shell 12 and defining the longitudinal extent of the chamber. The lower or free edge of chamber 16 is provided with a recess or notch 28 along all four sides thereof for receiving the cover plate 18 and hermetically and sealably enclosing a suitable fluid within the bubble chamber of the level. The cover plate 18 is a generally rectangular member having a planar central body portion 32 circumscribed by an integral outer rim 34 extending well below the plane of the central portion to give a generally concave appearance to the exposed surface of the plate 18. In accordance with the preferred embodiment, the circumferential rim 34 of the cover plate is provided with a stepped shoulder 36 complementary to recess 28. The shoulder 36 carries a continuous sealing rib 38 upstanding therefrom so that upon mounting of the cover plate 18 on the bubble chamber, the planar body portion 32 is disposed well within the chamber and the rib contacts the recess 28 and forms an initial fluid seal for the chamber. Although various techniques may be employed to seal the cover plate 18, after the bubble chamber is filled with a suitable fluid, such as a mineral spirit, the plate is preferably securely adhered to the bubble chamber by ultrasonic welding or a similar rapid sealing technique that does not require heating and will not distort the structure of otherwise adversely affect either the sealing operation or appearance of the final product.

The terminal legs 14 of the level are integrally formed on opposite ends of the elongated bridging portion 12 and extend outwardly therefrom to avoid contact of the bubble chamber with the work piece or adjacent obstructions. It is a feature of the present invention that the legs 14 are constructed so as to carry all the utile or work surfaces of the level with the exception of the reading surface of the bubble chamber 16. As shown, the legs 14 are also of an inverted, generally U-shaped or arched configuration, but extend transversely beyond and are of greater height than the bridging portion 12, extending well above and below that portion. The upstanding side walls 42, 44 of the legs 14 are integral longitudinal extensions of central body portion 12, but are of greater thickness and are securely interconnected in stabilizing fashion to end plates 48 integral with the arched walls 42, 44 from their base to approximately the height of the central body portion.

As mentioned, the legs 14 extend below the central body portion 12 of the level and are provided with accurately controlled flat bottom surfaces 52 serving as at least one set of working surfaces at each end of the line level. The terminal plate is also provided with an accurately formed bottom surface 54 coextensive with the working surfaces 52 and with a central V-shaped bottom notch 56 facilitating use of the level 10 on pipes or similarly curved members.

Each leg 14 also extends well above the central body portion 12 of the level in a generally arch shaped configuration to provide the integral supporting hooks 58 typical of line levels. The side wall 44 of each leg 14 terminates well short of the apex of the arch while opposite wall 42 continuously extends beyond the apex to provide a hook configuration, but terminates short of the opposite side wall 44 to define an access opening 62 permitting passage therethrough of the line on which the level is to be hung. As best shown in FIG. 3, the hook 58 is provided with an accurately formed notched interior surface 64 at the apex of the arch to more positively hold the line and, more importantly, assure accurate mounting of the level on the line. As clearly shown, the ends of the level are mirror images of each other, although it will be appreciated that the hooks 48 could just as easily face in opposite directions.

The one piece line level of the present invention can be formed from any one of a wide variety of plastic materials having the requisite transparency and dimensional stability. However, the tough thermoplastics which heretofore have been used for level vial stock are generally preferred in view of their proven performance characteristics. In addition to the requisite transparency and dimensional stability which is preferred, the material additionally should lend itself to ready sealability of the bubble chamber without causing distortion or otherwise adversely affecting the appearance of the resultant product. As mentioned, the materials found most acceptable for this purpose are the tough thermoplastics such as the clear acrylic materials. It will of course be appreciated that other materials of comparable quality such as cellulose acetate butyrate or similar moldable plastics may be used with good results. However, the acrylics are preferred since they readily lend themselves to the preferred molding operation of the present invention.

One of the principle features of the present invention is a new and improved process of producing these line levels whereby the one piece level body member is formed from a mold construction wherein only a single die member requires precise machining tolerances. Thus, as shown in FIGS. 2–4, the present invention employs a mold wherein the lower or male die member 72 is constructed so as to form each and every working surface of the line level. In the embodiment illustration the single male die member not only controls formation of the interior concave configuration of the bubble chamber (as best shown in FIG. 4), but also provides the accurate relationship between the bubble chamber and the flat bottom surfaces and line contacting surfaces on each terminal leg of the level. Additionally, it controls the accurate positioning and configuration of the interior surface of the line hooks provided by each terminal leg of the level. As can be appreciated, even the bottom surface of the 120° notch in the end plates of the terminal supporting legs is controlled by the single male die member. In the preferred embodiment these working surfaces of the level are formed with sufficient accuracy to be within less than 0°5' of perpendicularity relative to the center line of the level.

Not only does the single die 72 control the relative positioning and accuracy of the functional work surfaces of the line level located on the terminal legs, but additionally provides control over the longitudinally extended curvature or radius in the bubble contacting surface 74 of the bubble chamber, thereby controlling not only the accuracy of the bubble chamber relative to the work surfaces, but also the sensitivity and precision of the line level. In the preferred embodiment the level exhibits a sensitivity of less than 1° and usually about 0°45'. By this technique it is possible to incorporate into the bubble chamber not only precise alignment, but also increased angles of curvature on the bubble contacting surface thereby permitting the level to be used to read pitches of different degrees. This further enables the line level to be accurately employed to control the pitches of drain pipes of similar sloping members in a manner heretofore unobtainable with levels of comparable size and cost.

It will be additionally appreciated that the single male die member can be controlled with sufficient accuracy so as to eliminate the need for machining operations. Levels having different degrees of curvature and different degrees of accuracy also can be achieved by merely changing only one of the two die members of the mold. Further, the different male die members can be interchangeable thereby permitting full utilization of the other side member during all molding operations.

As will be appreciated, the use of the single die member 72 capable of defining all utile or work surfaces of the level including the degree of curvature in the bubble chamber eliminates the need for highly skilled labor in the production or assembly of the line level and therefore provides substantial economies of manufacture without sacrificing accuracy. In fact, in accordance with the present invention, improved accuracy is achieved. Additionally, the dome-shaped shell construction permits simple straight line retraction of a die member to open the mold and permit easy release of the molded article.

After the line level body portion has been molded in accordance with the techniques of this invention, it is a relatively simple matter to fill the bubble chamber with an appropriate liquid such as the aliphatic hydrocarbon material commonly referred to as mineral spirits and enclose the chamber with the cover plate. The desired hermetic seal is then effected in an appropriate fashion such as by ultrasonic welding or similar techniques. Subsequently, if desired, the vial bubble limit lines formed on the curved exterior surface of the bubble chamber can be painted or otherwise rendered more visible so that the position of the bubble can be more clearly determined.

As will be apparent to persons skilled in the art, various modifications, adaptations and variations of the foregoing specific disclosure can be made without departing from the teachings of the present invention.

We claim:

1. A molded line level formed of transparent plastic material and free of machined surfaces comprising a molded one piece level body member having an elongated bridging portion of inverted U-shaped cross section integrally connected to and suspended between a pair of enlarged terminal supporting leg portions of arched configuration, each of said leg portions bearing a plurality of bottom work surfaces formed by a V-groove intersecting a plannar surface of said leg portion, the V-groove being employed when the level is used on a pipe or the like to engage a non-planar surface, said bridging portion including a central bubble chamber extending longitudinally of said bridging portion, said bubble chamber having an inverted U-shaped cross section wherein the sides of the bubble chamber are constituted by the sides of the bridging portion and being provided with an internal bubble contacting top surface having a molded longitudinal curvature with its accuracy controlled at the time of its formation, said central bubble chamber having a pair of spaced end walls extending transversely across the interior of the bridging portion and integrally formed therewith to stabilize the structure and define the ends of the bubble chamber, said end walls being symmetrically spaced from both of said leg portions whereby said chamber occupies less than one half of the levels total length, said leg portions including upstanding hooks having accurately molded line engaging surfaces fixedly positioned relative to said top surface of the bubble chamber extending end plates rigidly stabilizing the arched terminal, said bubble chamber being sealably enclosed with a cover plate engaging the end walls and sides of the bubble chamber.

2. The line level of claim 1 wherein said line engaging surfaces are located at the apex of the arch above said bridging portion.

3. The line level of claim 1 wherein the transparent plastic material is an acrylic thermoplastic material.

* * * * *

UNITED STATES PATENT OFFICE
CERTIFICATE OF CORRECTION

Patent No. 3,878,617  Dated April 22, 1975

Inventor(s) Robert F. West & Maarten Cornelis De Jong

It is certified that error appears in the above-identified patent and that said Letters Patent are hereby corrected as shown below:

Column 1, line 14, after "been" insert --the--.

Column 1, line 59, cancel "cross-secion" and substitute therefor --cross-section--.

Column 5, line 28, cancel "side" and substitute therefor --die--.

Signed and Sealed this twenty-ninth Day of July 1975

[SEAL]

Attest:

RUTH C. MASON
*Attesting Officer*

C. MARSHALL DANN
*Commissioner of Patents and Trademarks*